(12) United States Patent
Sekido

(10) Patent No.: US 12,487,445 B2
(45) Date of Patent: Dec. 2, 2025

(54) IMAGE PICKUP UNIT AND ENDOSCOPE

(71) Applicant: OLYMPUS MEDICAL SYSTEMS CORP., Tokyo (JP)

(72) Inventor: Takanori Sekido, Sagamihara (JP)

(73) Assignee: OLYMPUS MEDICAL SYSTEMS CORP., Tokyo (JP)

( * ) Notice: Subject to any disclaimer, the term of this patent is extended or adjusted under 35 U.S.C. 154(b) by 313 days.

(21) Appl. No.: 18/371,176

(22) Filed: Sep. 21, 2023

(65) Prior Publication Data

US 2024/0012233 A1    Jan. 11, 2024

Related U.S. Application Data

(63) Continuation of application No. PCT/JP2021/021217, filed on Jun. 3, 2021.

(51) Int. Cl.
*G02B 23/24* (2006.01)
*H04N 23/50* (2023.01)

(52) U.S. Cl.
CPC ......... *G02B 23/243* (2013.01); *H04N 23/555* (2023.01)

(58) Field of Classification Search
CPC .... G02B 23/243; G02B 23/24; H04N 23/555; A61B 1/05
See application file for complete search history.

(56) References Cited

U.S. PATENT DOCUMENTS

| 6,767,322 | B1 * | 7/2004 | Futatsugi | A61B 1/00096 |
| | | | | 600/129 |
| 10,200,580 | B2 * | 2/2019 | Shimono | A61B 1/0011 |
| 2010/0214676 | A1 * | 8/2010 | Suda | A61B 1/00096 |
| | | | | 359/819 |
| 2013/0329026 | A1 | 12/2013 | Hida et al. | |

(Continued)

FOREIGN PATENT DOCUMENTS

| EP | 2 680 059 A1 | 1/2014 |
| JP | 2012-018993 A | 1/2012 |

(Continued)

OTHER PUBLICATIONS

International Search Report dated Jul. 13, 2021 received in PCT/JP2021/021217.

*Primary Examiner* — Christopher E Leiby
(74) *Attorney, Agent, or Firm* — Scully, Scott, Murphy & Presser, P.C.

(57) ABSTRACT

An image pickup unit includes: a three-dimensional wiring board having a recess; a stacked device including multiple optical elements and an image pickup device housed in the recess; and sealing resin filling a gap between the recess and the stacked device, in which the multiple optical elements include a composite element having a first optical member and a second optical member disposed on the first optical member, the second optical member has an elastic modulus smaller than an elastic modulus of the first optical member and an elastic modulus of the image pickup device, and larger than or equal to an elastic modulus of the sealing (Continued)

resin, and the sealing resin has a thermal expansion coefficient larger than a thermal expansion coefficient of the first optical member and a thermal expansion coefficient of the image pickup device, and smaller than a thermal expansion coefficient of the second optical member.

7 Claims, 2 Drawing Sheets

(56) References Cited

U.S. PATENT DOCUMENTS

| | | | | |
|---|---|---|---|---|
| 2016/0005512 A1* | 1/2016 | Sekido | ............... | H02G 1/14 |
| | | | | 174/72 A |
| 2017/0172388 A1* | 6/2017 | Ohno | ............... | A61B 1/00124 |
| 2018/0277583 A1 | 9/2018 | Harazono | | |
| 2019/0076002 A1* | 3/2019 | Shimohata | ............... | H04N 23/55 |
| 2019/0175004 A1* | 6/2019 | Suyama | ............... | A61B 1/051 |
| 2019/0335068 A1* | 10/2019 | Kato | ............... | A61B 1/07 |
| 2020/0195867 A1* | 6/2020 | Itoi | ............... | H04N 23/57 |
| 2020/0249473 A1* | 8/2020 | Genda | ............... | G02B 7/025 |
| 2021/0093165 A1* | 4/2021 | Iyoshi | ............... | A61B 1/00096 |
| 2021/0271048 A1* | 9/2021 | Maesaka | ............... | G02B 7/025 |
| 2023/0367184 A1* | 11/2023 | Inaba | ............... | G02B 7/021 |

FOREIGN PATENT DOCUMENTS

| | | |
|---|---|---|
| JP | 2013-200537 A | 10/2013 |
| JP | 2019-076358 A | 5/2019 |
| JP | 6533787 B2 | 6/2019 |
| WO | 2015/082328 A1 | 6/2015 |
| WO | 2017/094777 A1 | 6/2017 |
| WO | 2017/203592 A1 | 11/2017 |

* cited by examiner

IMAGE PICKUP UNIT AND ENDOSCOPE

CROSS REFERENCE TO RELATED APPLICATION

This application is a continuation application of PCT/JP2021/021217 filed on Jun. 3, 2021, the entire contents of which are incorporated herein by this reference.

BACKGROUND OF THE INVENTION

1. Field of the Invention

The present invention relates to an image pickup unit that includes a stacked device, and an endoscope having a distal end portion provided with the image pickup unit that includes a stacked device.

2. Description of the Related Art

It is important for an image pickup unit disposed at a distal end portion of an insertion section of an endoscope to have a small diameter in order to be less invasive.

Japanese Patent Application Laid-Open Publication No. 2012-18993 discloses a stacked device with which a small-diameter image pickup unit can be efficiently produced. The stacked device is produced by bonding a plurality of lens wafers, each including a plurality of lenses, and a plurality of image pickup devices by means of resin and thereafter cutting the bonded lens wafers and image pickup devices.

International Publication No. 2015/082328 (Japanese Patent No. 6533787) discloses an image pickup unit that includes a stacked device housed in a groove of an MID.

SUMMARY OF THE INVENTION

An image pickup unit according to an embodiment of the present invention includes: a three-dimensional wiring board having a recess; a stacked device including a plurality of optical elements and an image pickup device that are housed in the recess; and sealing resin that fills a gap between the recess and the stacked device, in which the plurality of optical elements include a composite element that has a first optical member and a second optical member disposed on the first optical member, the second optical member has an elastic modulus smaller than an elastic modulus of the first optical member and smaller than an elastic modulus of the image pickup device, and larger than or equal to an elastic modulus of the sealing resin, and the sealing resin has a thermal expansion coefficient larger than a thermal expansion coefficient of the first optical member and larger than a thermal expansion coefficient of the image pickup device, and smaller than a thermal expansion coefficient of the second optical member.

An endoscope according to another embodiment includes an image pickup unit, and the image pickup unit includes: a three-dimensional wiring board having a recess; a stacked device including a plurality of optical elements and an image pickup device that are housed in the recess; and sealing resin that fills a gap between the recess and the stacked device, in which the plurality of optical elements include a composite element that has a first optical member and a second optical member disposed on the first optical member, the second optical member has an elastic modulus smaller than an elastic modulus of the first optical member and smaller than an elastic modulus of the image pickup device, and larger than or equal to an elastic modulus of the sealing resin, and the sealing resin has a thermal expansion coefficient larger than a thermal expansion coefficient of the first optical member and larger than a thermal expansion coefficient of the image pickup device, and smaller than a thermal expansion coefficient of the second optical member.

DETAILED DESCRIPTION OF THE PREFERRED EMBODIMENTS

First Embodiment

Figure 1:
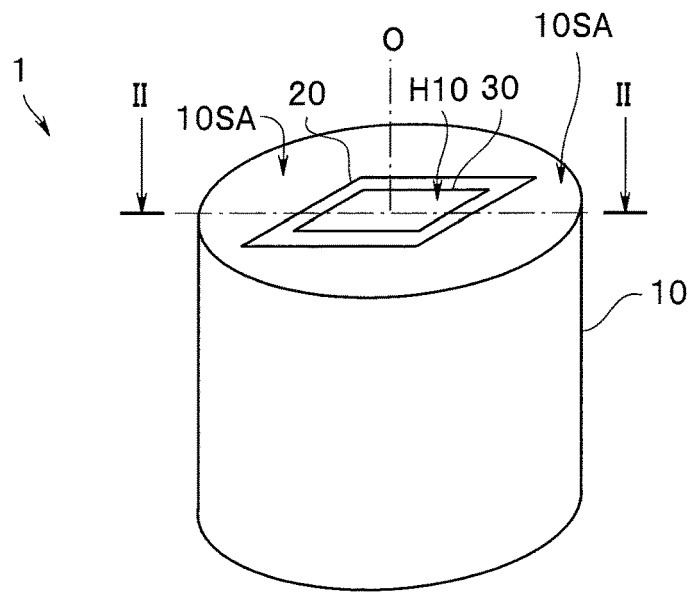
FIG. 1 is a perspective view of an image pickup unit according to a first embodiment.
Figure 2:
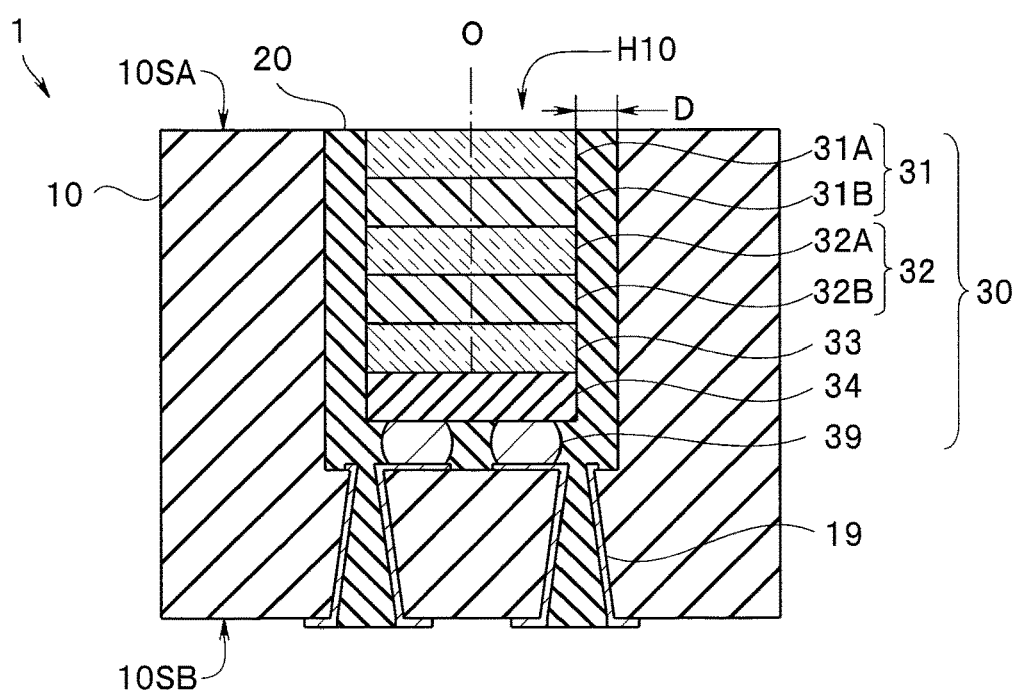
FIG. 2 is a cross-sectional view along a line II-II of FIG. 1.

An image pickup unit 1 according to the present embodiment includes a three-dimensional wiring board 10, sealing resin 20, and a stacked device 30 as shown in FIGS. 1 and 2.

The drawings based on the embodiments are schematically shown. The relationships between the thickness and width of each portion, the thickness ratios between respective portions and the like are different from actual ones. Some portions may have different dimensional relationships or ratios between different figures. Some components may be omitted from the drawings, and may have no reference numeral. A direction in which light is incident is referred to as an "upward" direction.

The three-dimensional wiring board 10, which is not a flat wiring board, is an MID (molded interconnect device) for example, and has an upper surface 10 SA that is provided with a bottomed recess (cavity) H10 having an opening. The stacked device 30 housed in the recess H10 includes a plurality of optical elements 31, 32, and 33 that constitute an optical system, and includes an image pickup device (image sensor) 34 serving as an image pickup part, which are stacked together. The sealing resin 20 fills a gap between the recess H10 and the stacked device 30.

The optical element 31 is a hybrid lens element (composite element) that includes a glass plate serving as a first optical member 31A and includes a resin lens serving as a second optical member 31B disposed on a lower surface of the first optical member 31A. The optical element 32 is a hybrid lens element that includes a glass plate serving as a first optical member 32A and includes a resin lens serving as a second optical member 32B disposed on an upper surface of the first optical member 32A. The optical element 33 is an infrared cut filter element made of a glass plate, for example, infrared blocking glass.

In the cross-sectional view, the optical elements and the like of the stacked device 30 are illustrated as flat plates. Adhesive layers for bonding the stacked optical elements are not illustrated, because such layers are thin and have only a negligible influence on the thermal stress.

The hybrid lens element is produced by disposing a resin lens/resin spacer on a glass plate. For example, transparent uncured liquid or gel ultraviolet-curable resin is disposed on a glass plate. The resin is then irradiated with ultraviolet rays with a mold having a recess of a certain internal shape pressed against the resin on the glass, thereby curing the resin. The outer surface shape of the resin lens is formed by transfer of the internal shape of the mold, so that even a non-spherical lens can be readily produced.

Examples of the first optical members 31A and 31B and the optical element 33 include borosilicate glass, fused quartz, and sapphire glass. Examples of the second optical members 31B and 32B, and the sealing resin 20 include silicone resin, epoxy resin, and acrylic resin.

A base material for the three-dimensional wiring board 10 is electrically nonconductive resin, and is particularly engineering plastic that can be shaped with a mold. Examples of the base material include PA (polyatnide), PC (polycarbonate), LCP (liquid crystal polymer), PEEK (poly ether ether ketone), nylon, PPA (polyphthalamide), ABS (acrylonitritelbutadienelstyrene), and composite resin being a mixture of such resin and an inorganic filler.

The configuration of the optical system, that is, configurations (thickness, shape), types, numbers, and stacking order of the optical elements (first optical member/second optical member) may be modified in various manners in accordance with specifications. For example, the first optical members and the second optical members may be disposed not alternately. A principal surface of the optical element may be provided with a patterned light-shielding film serving as an aperture. Although an outer shape of the image pickup unit 1 is cylindrical herein, the outer shape may be prismatic or a combination of cylindrical and prismatic shapes.

The image pickup device 34, the base material for which is silicon, has a light receiving portion made of a CCD or the like. The image pickup device 34 receives driving signals and transmits image pickup signals through solder 39 on the lower surface and through-hole wiring 19 of the three-dimensional wiring hoard 10.

Regarding the image pickup part, a semiconductor device for processing the image pickup signals may be stacked on the lower surface of the image pickup device 34, and a cover glass may be disposed on the upper surface of the image pickup device 34.

The sealing resin 20 fills the gap between a wall surfaces of the recess H10 of the three-dimensional wiring board 10 and side surfaces of the stacked device 30. The sealing resin 20 seals the side surfaces of the stacked device 30 and, at the same time, relaxes stresses generated in the stacked device 30, as described later.

A width of the gap, that is, a thickness D of the sealing resin 20 is desirably more than a predetermined thickness in order to relax stresses generated in the stacked device 30. Hence, the gap preferably has a width of 100 μm to 800 μm, for example.

It is preferable that the sealing resin 20 exhibit a light shielding property by containing light shielding particles, for example, in order that external light is prevented from entering through the side surfaces of the stacked device 30.

The image pickup unit 1 is configured such that an elastic modulus E and a thermal expansion coefficient α of a plurality of constituent members of the stacked device 30 satisfy predetermined conditions as shown in Table 1 below. The elastic modulus E represents a tensile elastic modulus determined in accordance with JIS K7113 (25° C.). The thermal expansion coefficient represents a linear expansion coefficient determined in accordance with JIS K7197, JIS 83251, and JIS Z 2255.

TABLE 1

|  | First optical member (glass) | Second optical member (resin) | Image pickup device (silicon) | Sealing resin |
|---|---|---|---|---|
| Elastic modulus E (GPa) | 80 | 2.67 | 160 | 2.4 |
| Thermal expansion coefficient α (ppm/K) | 7.2 | 90 | 3.23 | 70 |

In other words, an elastic modulus E2 of the resin serving as the second optical members 31B and 32B is smaller than an elastic modulus E1 of the glass plate serving as the first optical member and smaller than an elastic modulus E3 of the image pickup device 34, and is larger than an elastic modulus E4 of the sealing resin 20. In addition, a thermal expansion coefficient α4 of the sealing resin 20 is larger than a thermal expansion coefficient α1 of glass plates 31A, 32A, and 33 serving as the first optical members and larger than a thermal expansion coefficient α3 of the image pickup device 34, and is smaller than a thermal expansion coefficient α2 of the resin lenses serving as the second optical members 31B and 32B.

For example, the thermal expansion coefficient α1 is 5 ppm/K to 10 ppm/K, and the elastic modulus E1 is 70 GPa to 100 GPa. The thermal expansion coefficient α2 is 60 ppm/K to 100 ppm/K, and the elastic modulus E2 is 2.6 GPa to 10 GPa. Note that "X1 to X2" represents "larger than X1 and smaller than X2", for example.

The base material for the three-dimensional wiring board 10 (e.g. PEEK resin) has the thermal expansion coefficient α of 18 ppm/K to 26 ppm/K and has the elastic modulus E of 10 to 20 GPa. The solder 39 has the thermal expansion coefficient α of 20 ppm/K to 30 ppm/K and has the elastic modulus E of 50 GPa to 100 GPa.

The image pickup unit 1 includes the sealing resin 20 that fills the gap between the stacked device 30 and the three-dimensional wiring board 10. Thus, when the image pickup unit 1 is subjected to a mechanical load such as impact, the sealing resin 20 is also subjected to such a load, and therefore the stress against the stacked device 30 is relaxed.

When the image pickup unit 1 thermally changes due to external temperature changes or driving of the image pickup unit 1, the stacked device 30 is subjected to thermal strain, since the first optical members 31A and 32A, the second optical members 31B and 32B, and the image pickup device 34 have different thermal expansion coefficients. However, the sealing resin 20 absorbs the stress through deformation, since the sealing resin 20 has the elastic modulus smaller than the elastic modulus of the stacked device 30 (the first optical members 31A and 32A, the second optical members 31B and 32B, and the image pickup device 34) in the image pickup unit 1. Accordingly, the stress generated in the stacked device 30 is relaxed.

The sealing resin 20 preferably has the thermal expansion coefficient α4 of 45 ppm/K to 80 ppm/K, and has the elastic modulus E4 of 1.0 GPa to 2.5 GPa in order to protect the stacked device 30.

The stacked device 30 is preferably configured such that an occupancy of the first optical member (total thickness in an optical axis direction) is smaller than an occupancy of the second optical member, because such a configuration can reduce the risk of strain resulting from thermal expansion.

Modification of First Embodiment

Figure 3:
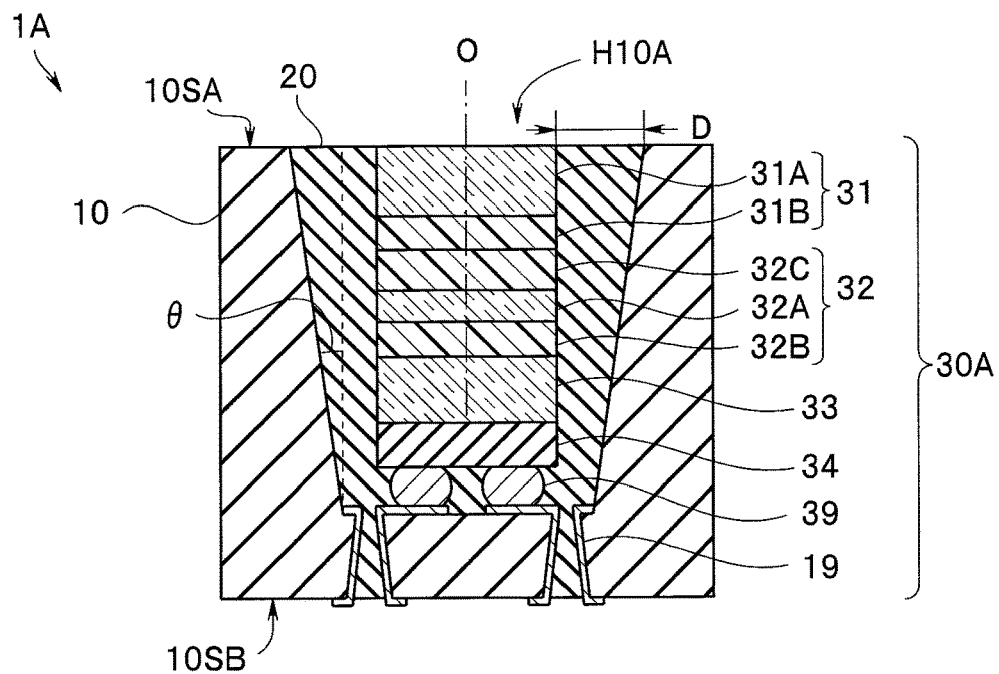
FIG. 3 is a cross-sectional view of an image pickup unit according to a first modification of the first embodiment.

An image pickup unit 1A according to a modification shown in FIG. 3 and the image pickup unit 1 are similar to each other and have the same effects, and hence their components having the same function are given the same reference numerals, and the description thereof will be omitted.

According to a stacked device 30A of the image pickup unit 1A, an optical element 32 is a hybrid lens element that includes a glass plate serving as a first optical member 32A, a resin lens serving as a second optical member 32C disposed on an upper surface of the first optical member 32A, and a resin lens and a resin spacer serving as a second optical member 32B disposed on a lower surface.

According to the image pickup unit 1A, a three-dimensional wiring board 10A has a recess H10A an opening of which has a larger area than a bottom surface. In other words, a wall surface of the recess H10A is not vertical but inclined with respect to an upper surface 10SA. As described earlier, when the image pickup unit thermally changes due to external temperature change or driving of the image pickup unit, the stacked device is subjected to thermal strain. The strain accumulates in the respective stacked optical members of the stacked device. The stacked device has an image pickup device 34 at a lower side fixed to a bottom surface of the recess H10A, and accordingly increases in susceptibility to thermal strain toward an upper side.

A sealing resin 20, which has a small elastic modulus, exhibits a greater stress relaxation effect through deformation as a thickness D of the sealing resin 20 increases. According to the image pickup unit 1A, the three-dimensional wiring board 10A has the recess H10A a sectional area of which increases from the bottom surface toward the opening, and hence the thickness D of the sealing resin 20 increases from the bottom surface toward the opening. The image pickup unit 1A includes the sealing resin having the thickness D in proportion to the degree of thermal strain, and thus is more reliable than the image pickup unit 1.

A side wall of the recess H10A preferably has an inclination angle θ of more than 1 degree and less than 5 degrees, for example. With an inclination angle θ exceeding the aforementioned range, the sealing resin 20 significantly exhibits stress relaxation effects. With an inclination angle θ of less than the aforementioned range, the image pickup unit minimally increases in dimension in a direction orthogonal to an optical axis.

Second Embodiment

Figure 4:
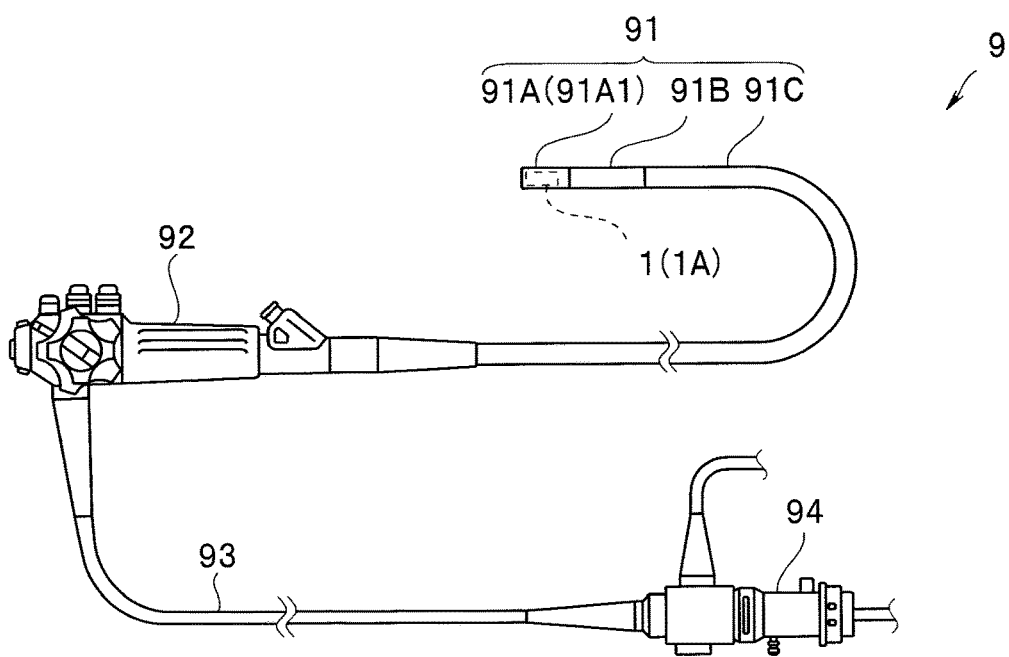
FIG. 4 is a perspective view of an endoscope according to a second embodiment.

An endoscope 9 according to the present embodiment shown in FIG. 4 includes an insertion section 91, an operation section 92, a universal cord 93, and an endoscope connector 94.

The insertion section 91, which has a shape of elongated tube, is to be inserted into a body cavity of a living body. The insertion section 91 includes a distal end portion 91A, a bending section 91B, and a flexible tube 91C continuously connected in order from the distal end side, and is flexible as a whole.

The distal end portion 91A has a rigid member 91A1 that houses various types of units. The various types of units include an image pickup unit 1 or 1A, a treatment instrument insertion channel, a lighting unit, and the like.

The bending section 91B bends in up, down, left and right directions in response to rotational movements of a bending knob of the operation section 92 which is provided for bending operations.

The flexible tube 91C is a passively-flexible soil tubular member. The flexible tube 91C houses the treatment instrument insertion channel, various types of electrical signal lines, a light guide fiber bundle, and the like inserted therein. The electrical signal lines extend from the image pickup unit included in the distal end portion 91A through the operation section 92 to the universal cord 93. The light guide fiber bundle guides light from a light source device, which is an external apparatus, toward a distal end plane of the distal end portion 91A.

The operation section 92 is connected to a proximal end portion of the insertion section 91, and has a plurality of operation members and the like. The universal cord 93 is flexible tubular member extending from the operation section 92. The endoscope connector 94 is a connecting member that connects the universal cord 93 and an external apparatus.

The endoscope 9 includes the image pickup unit 1 or 1A disposed at the distal end portion 91A of the insertion section 91. Since the image pickup unit 1 or 1A is highly reliable as already described, the endoscope 9 is highly reliable.

The endoscope may be a flexible endoscope having a flexible insertion section or a rigid endoscope having a rigid insertion section. The endoscope may be used for medical or industrial purposes.

The present invention is not limited to the above-described embodiments, and can be modified, combined, or put into practice in various manners without departing from the spirit of the present invention.

What is claimed is:

1. An image pickup unit comprising:
   a three-dimensional wiring board having a recess;
   a stacked device including a plurality of optical elements and an image pickup device that are housed in the recess; and
   sealing resin that fills a gap between the recess and the stacked device, wherein
   the plurality of optical elements include a composite element that has a first optical member and a second optical member disposed on the first optical member,
   the second optical member has an elastic modulus smaller than an elastic modulus of the first optical member and smaller than an elastic modulus of the image pickup device, and larger than or equal to an elastic modulus of the sealing resin, and
   the sealing resin has a thermal expansion coefficient larger than a thermal expansion coefficient of the first optical member and larger than a thermal expansion coefficient of the image pickup device, and smaller than a thermal expansion coefficient of the second optical member.

2. The image pickup unit according to claim 1, wherein an occupancy of the first optical member is smaller than an occupancy of the second optical member in the stacked device.

3. The image pickup unit according to claim 1, wherein the sealing resin has a thermal expansion coefficient of 45 ppm/K to 80 ppm/K and has an elastic modulus of 1.0 GPa to 2.5 GPa.

4. The image pickup unit according to claim 1, wherein the sealing resin has a light shielding property.

5. The image pickup unit according to claim 1, wherein
the first optical member is a glass plate,
the second optical member is a resin lens, and
the composite element is a hybrid lens element.

6. The image pickup unit according to claim 1, wherein
a thickness of the sealing resin increases from a bottom surface toward an opening of the recess.

7. An endoscope including an insertion section having a distal end portion that is provided with an image pickup unit, the image pickup unit comprising:
a three-dimensional wiring board having a recess;
a stacked device including a plurality of optical elements and an image pickup device that are housed in the recess; and
sealing resin that fills a gap between the recess and the stacked device, wherein
the plurality of optical elements include a composite element that has a first optical member and a second optical member disposed on the first optical member,
the second optical member has an elastic modulus smaller than an elastic modulus of the first optical member and smaller than an elastic modulus of the image pickup device, and larger than or equal to an elastic modulus of the sealing resin, and
the sealing resin has a thermal expansion coefficient larger than a thermal expansion coefficient of the first optical member and larger than a thermal expansion coefficient of the image pickup device, and smaller than a thermal expansion coefficient of the second optical member.

\* \* \* \* \*